UNITED STATES PATENT OFFICE.

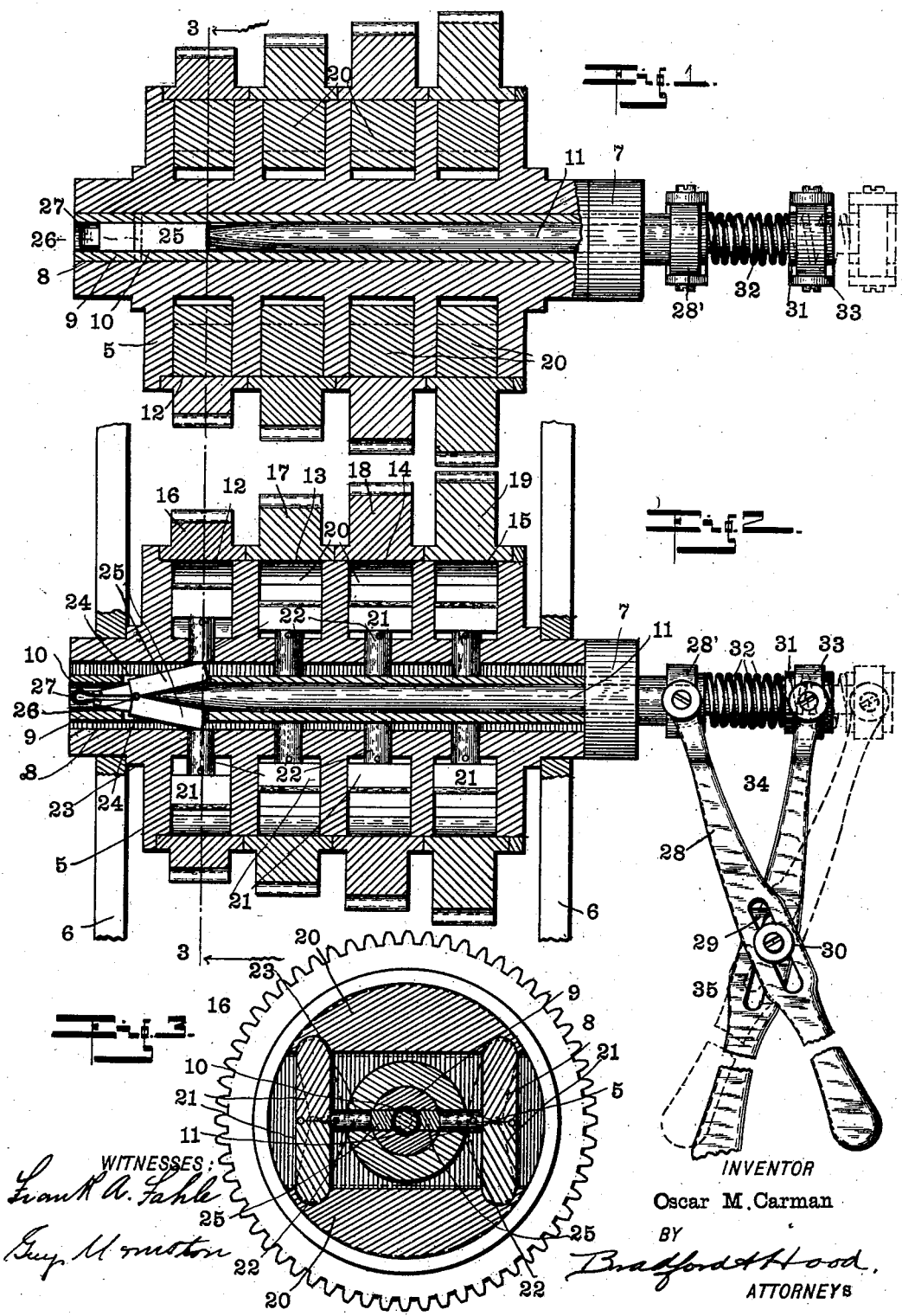

OSCAR M. CARMAN, OF INDIANAPOLIS, INDIANA.

CHANGE-SPEED GEARING.

SPECIFICATION forming part of Letters Patent No. 711,937, dated October 28, 1902.

Application filed February 8, 1902. Serial No. 93,212. (No model.)

*To all whom it may concern:*

Be it known that I, OSCAR M. CARMAN, a citizen of the United States, residing at Indianapolis, in the county of Marion and State of Indiana, have invented certain new and useful Improvements in Change-Speed Gearing, of which the following is a specification.

My invention relates to an improvement in speed-changing gears especially adapted for use in automobiles.

The object of my invention is to provide means by which intermediate gearing between the motor and the driving-wheels may be easily changed from one extreme to the other without the necessity of bringing into action the gearing used for any intermediate speeds and yet of such character that the intermediate speed desired may be obtained.

The accompanying drawings illustrate my invention.

Figure 1 is a central axial section. Fig. 2 is a similar section at right angles to Fig. 1. Fig. 3 is a transverse section on line 3 3 of Figs. 1 and 2.

In the drawings, 5 indicates a shaft journaled in suitable bearings 6, one end of said shaft being projected from the bearing, if desired, as at 7, to receive suitable driving connections. Shaft 5 is provided with an axial bore 8, within which is reciprocably mounted a shaft 9, which in turn is provided with an axial bore 10, within which is reciprocably mounted a rod 11.

Formed in shaft 5 is any desired number of peripheral grooves 12, 13, 14, and 15, over which are rotatably mounted gears or transmission elements 16, 17, 18, and 19, respectively. Mounted in each peripheral groove is a pair of arc-shaped friction-shoes 20, the periphery of each of which is of the same radius as the external diameter of shaft 5 or the bore of the adjacent gear. Arranged between the opposed ends of the two shoes 20 are two toggle-levers 21, the middle of each of which is adapted to be engaged by a pin 22, which extends radially from the bottom of the peripheral groove in which it is mounted into bore 8. The two pins are preferably diametrically opposed, and the inner ends lie in a pair of diametrically-opposed key-seats 23, formed in shaft 9. Formed in the bottoms of the key-seats 23 at diametrically opposite points are openings 24, which lead into bore 10 of shaft 9, and seated in each of these openings is a block 25. Blocks 25 are hinged together at a point between their ends, as at 26, and are normally held together by a spring 27, the said blocks when held together lying entirely beneath the bottoms of key-seats 23. Rod 11 is pointed at its inner end, and the said pointed end is adapted to be inserted between the free ends of blocks 25, so as to swing the same upon their hinge and project them in opposite directions into the adjacent key-seats 23, so as to form a pair of inclines adapted to engage the inner ends of pins 22.

For the purpose of shifting shaft 9 and the parts which it contains I provide a lever 28, which is provided with a slot 29, adapted to receive a stationary fulcrum-pin 30. Lever 28 is pivoted to a collar 28', rotatable upon the hollow shaft 9.

The outer end of bar 11 is provided with a collar 31, and between said collar and the end of shaft 9 I mount a spring 32, which normally urges the pointed end of rod 11 out of engagement of blocks 25. Rotatably mounted upon rod 11 is a collar 33, to which is pivoted one end of a lever 34, provided with a slot 35, adapted to receive the fulcrum 30. It will be readily understood that a slotted connection between the levers and collars may be substituted for the slotted fulcrum connection.

In operation spring 32 normally holds the pointed end of rod 11 out of engagement with blocks 25, so that said blocks are held below the bottoms of the key-seats 23. In this position shaft 9 may be shifted axially within shaft 5 by means of lever 28, blocks 25 riding freely beneath pins 11 and all of the gears being free to rotate upon shaft 5 or allowing shaft 5 to rotate freely therein. In order to connect any gear with shaft 5, the operator swings lever 28 until shaft 9 is drawn to a point where the hinged ends of blocks 25 lie beneath the pins 22 of the desired gear. Lever 34 is then swung so as to compress spring 32 and force the pointed end of rod 11 between the blocks 25, thus swinging said blocks outward into their respective keyways. Lever 28 is then swung so as to bring the inclines formed by blocks 25 into engagement with the pins 22, thus forcing them outward in opposite directions into engagement with their respective toggle-levers, and thus forcing the two shoes 20 in opposite directions and into frictional contact with the gear which runs thereover.

By this construction I am able to form a driving connection with any one of the gears by a gradual contact, so that the change of speed may be gradually acquired. I am also enabled to pass from one speed to any other speed without passing through the intermediate-speed positions.

I claim as my invention—

1. In a speed-changing gearing, the combination with a shaft, of a plurality of transmission elements independently rotatable thereon, a plurality of friction-shoes, one for each transmission element, carried by the shaft, and a single means carried by the shaft for engaging and forcing the shoes each into contact with its transmission element without an intermediate operation of another transmission element.

2. In a speed-changing gearing, the combination with a shaft having a peripheral groove formed therein, of a transmission element rotatable thereover, a pair of arc-shaped friction-shoes arranged in opposition to each other in said groove, a pair of toggle-levers engaging the opposite ends of said shoes, a pair of plungers each engaging one of the toggle-levers and extending into the interior of the shaft, and means axially movable within the shaft for moving said plungers and operating the toggle-levers.

3. In a speed-changing gearing, the combination with a shaft having a peripheral groove formed therein, a transmission element mounted thereover, a pair of arc-shaped friction-shoes mounted in opposition to each other in said groove, a pair of toggle-levers engaging the opposite ends of said shoes, and means axially movable within the shaft for operating said toggle-levers.

4. In a speed-changing gearing, the combination with a shaft having a peripheral groove and an axial bore formed therein, of a transmission element rotatably mounted over said groove, a pair of arc-shaped friction-shoes mounted in opposition to each other in said groove, a pair of toggle-levers engaging the opposite ends of said shoes, a pair of radial pins projecting into the bore of the shaft and engaging the toggle-levers at their outer ends, an axially-movable hollow shaft mounted in the bore of the shaft and having a pair of opposed axial key-seats adapted to receive the inner ends of the radial pins, a pair of blocks 25 hinged together and mounted within the hollow shaft, means for projecting said blocks into said key-seats to form inclines adapted to engage the inner ends of the radial pins, and means for withdrawing said blocks from operative position, substantially as and for the purpose set forth.

5. In a speed-changing gearing, the combination with a plurality of independently-rotatable transmission elements, of a plurality of friction-shoes one adapted to engage each of said transmission elements, means for causing any one of said friction-shoes to drivingly engage its transmission element, and means for withdrawing said shoe-operating means from operating alinement whereby it may be caused to pass any one of the shoes without operating the same.

6. In a speed-changing gearing, the combination with a shaft having a plurality of peripheral grooves formed therein, of a plurality of transmission elements rotatably mounted one over each groove, a pair of arc-shaped friction-shoes arranged in opposition to each other in each of said grooves, a pair of toggle-levers engaging the opposite ends of each pair of shoes, a pair of plungers for each pair of toggle-levers extending into the interior of the shaft, and means axially movable within the shaft for moving any pair of said plungers to operate the adjacent toggle-levers.

7. In a speed-changing gearing, the combination with a shaft having a plurality of peripheral grooves formed therein, of a plurality of transmission elements rotatably mounted thereon one over each groove, a pair of arc-shaped friction-shoes mounted in opposition to each other in each of said grooves, a pair of toggle-levers engaging the opposite ends of each pair of said shoes, and means axially movable within the shaft for operating any pair of said toggle-levers.

8. In a speed-changing gearing, the combination with a shaft having an axial bore and a plurality of peripheral grooves formed therein, of a plurality of transmission elements rotatably mounted one over each of said grooves, a pair of arc-shaped friction-shoes mounted in opposition to each other in each of said grooves, a pair of toggle-levers engaging the opposite ends of each pair of shoes, a pair of radial pins for each pair of toggle-levers projecting into the bore of the shaft, an axially-movable hollow shaft mounted in the bore of the shaft and having a pair of opposed axial key-seats adapted to receive the inner ends of the radial pins, a pair of blocks 25 hinged together and mounted within the hollow shaft, means for projecting said blocks into said key-seats to form inclines adapted to engage the inner ends of the radial pins, and means for withdrawing said blocks from operative positions, substantially as and for the purpose set forth.

9. In a speed-changing gearing, the combination with a shaft having an axial bore and a plurality of peripheral grooves formed therein, of a plurality of transmission elements rotatably mounted one over each of said grooves, a pair of arc-shaped friction-shoes mounted in opposition to each other in each of said grooves, a pair of toggle-levers engaging the opposite ends of each pair of shoes, a pair of radial pins for each pair of toggle-levers projecting into the bore of the shaft, an axially-movable hollow shaft mounted in the bore of the shaft and having a pair of opposed axial key-seats adapted to receive the inner ends of the radial pins, a pair of blocks 25 hinged together and mounted within the hollow shaft, an axially-movable rod mounted within the hollow shaft and adapted to engage and separate the blocks 25 so as to project them into the key-seats, a spring normally withdrawing said rod from engagement with said blocks, a lever adapted to engage and shift the hollow shaft axially, and a lever adapted to shift the rod against the action of the spring, substantially as and for the purpose set forth.

In witness whereof I have hereunto set my hand and seal, at Indianapolis, Indiana, this 1st day of February, A. D. 1902.

OSCAR M. CARMAN. [L. S.]

Witnesses:
ARTHUR M. HOOD,
FRANK A. FAHLE.